Jan. 16, 1934.     A. S. FITZ GERALD     1,944,072
AUTOMATIC RECLOSING CIRCUIT BREAKER SYSTEM
Filed April 17, 1931
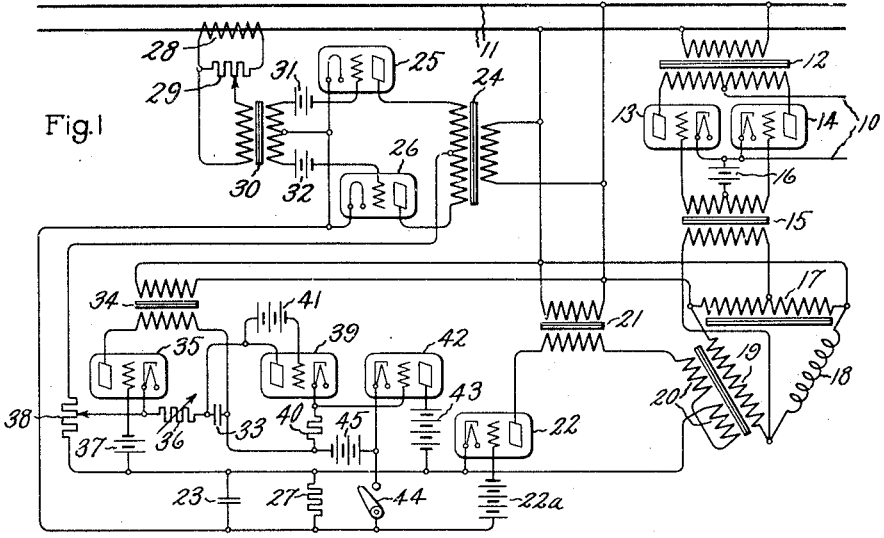
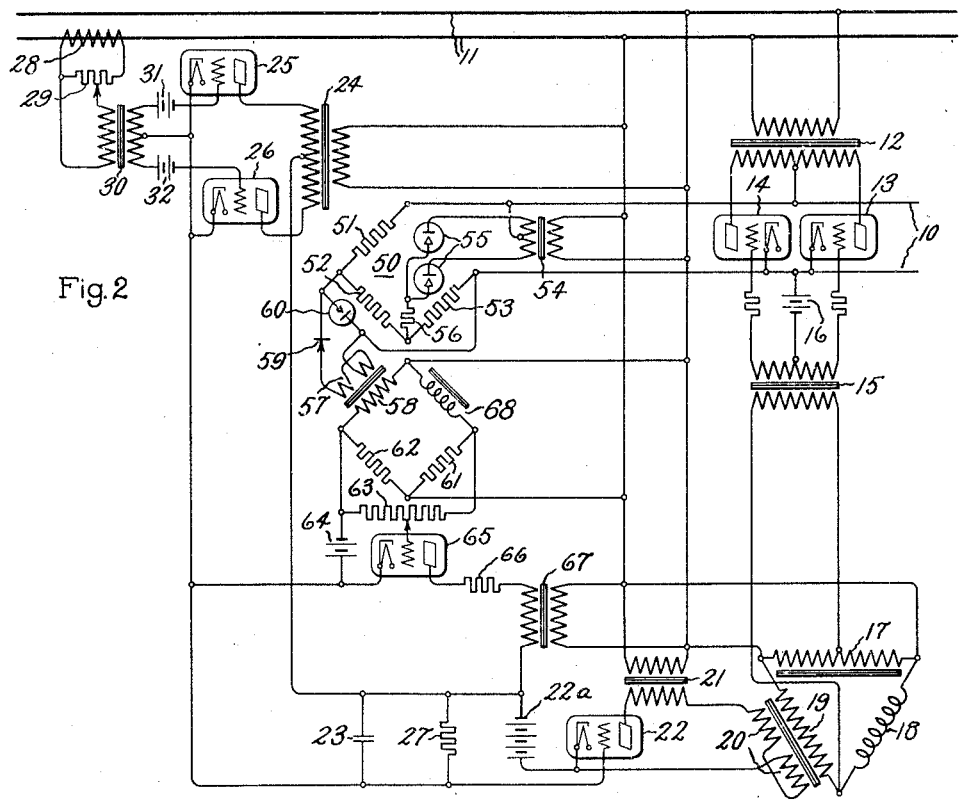
Inventor:
Alan S. FitzGerald,
by Charles E. Tullar
His Attorney.

Patented Jan. 16, 1934

1,944,072

UNITED STATES PATENT OFFICE 1,944,072

AUTOMATIC RECLOSING CIRCUIT BREAKER SYSTEM

Alan S. Fitz Gerald, Wynnewood, Pa., assignor to General Electric Company, a corporation of New York Application April 17, 1931. Serial No. 530,887

20 Claims. (Cl. 175—294)

My invention relates to automatic reclosing circuit breaker systems suitable for application to direct or alternating current circuits and more particularly to such systems in which all mechanical relays, switches and moving parts are eliminated and the desired control is effected by electric valve circuits.

Heretofore there have been devised numerous arrangements including electromagnetic and mechanical relays, switches and other moving parts for effecting the reclosing operation of a circuit breaker interconnecting a supply circuit and a direct or alternating current load circuit. Many of these arrangements of the prior art are extremely complicated and involve the use of moving parts and contacts, which are subject to wear and deterioration in use, and very sensitive mechanical and electrical devices, which require frequent calibration, all of which result in relatively high maintenance costs. At present there have come into use principally two types of automatic reclosing circuit breaker systems known as the notching system and the feeling out system. In the first of these systems, the circuit breaker is opened in response to a predetermined overload and is automatically reclosed a predetermined number of times and, after the successive reclosing of the breaker this number of times, it is permanently locked out. In the feeding out system, however, the circuit breaker is opened in response to a predetermined overload and is maintained in the open position until a feeling out circuit indicates, by means of suitable relays, that the load resistance has increased to its normal value.

It is an object of my invention to provide an improved automatic reclosing circuit breaker system including electric valves which will overcome certain disadvantages of the arrangements of the prior art and which will be simple, reliable and economical in operation.

It is another object of my invention to provide an improved automatic reclosing circuit breaker system including electric valves in which all moving parts and contacts are completely eliminated.

It is a further object of my invention to provide an improved automatic reclosing circuit breaking system including electric valves by means of which a direct or alternating current load circuit may be connected to and disconnected from an alternating current supply circuit a predetermined number of times and in which, after a predetermined number of successive closures under abnormal conditions, the load circuit will be permanently disconnected from the supply circuit.

It is a further object of my invention to provide an improved automatic reclosing circuit breaker system including electric valves in which a direct or alternating current load circuit is disconnected from its supply circuit in response to predetermined abnormal load conditions and is reconnected to the supply circuit only after abnormal conditions are removed from the load circuit.

It is a further object of my invention to provide an all electric control circuit including electric valves, which is particularly applicable to the notching and feeling out type of automatic reclosing circuit breaker systems.

In accordance with one embodiment of my invention a load circuit is connected to a supply circuit through circuit interrupting means preferably comprising a pair of electric valves, each provided with a control grid, and the grid potentials of these valves are shifted to phase opposition with their anode potentials in response to predetermined abnormal load conditions. During the small interval of time required for disconnecting the load circuit an impulse is stored in an electric valve circuit associated with the grid circuit. After a short predetermined interval of time, the grid potentials of the valves return to phase coincidence with the anode potentials to reclose the load circuit to the supply circuit. If abnormal load conditions still obtain the load circuit is again disconnected and another current impulse stored in the auxiliary valve circuit. This reclosing cycle is automatically repeated a predetermined number of times until the successive impulses stored in the auxiliary valve circuit are sufficient to effect the operation of another valve circuit arranged to maintain the grid potentials of the main power valves in phase opposition to their anode potentials and thus disconnect the load circuit from the supply circuit. Means are provided for slowly dissipating the current impulses stored in the auxiliary valve circuit so that unrelated interruptions separated by considerable time intervals will not cooperate to disconnect the load circuit permanently. In accordance with a modification of my invention, the load circuit is disconnected from the supply circuit in response to predetermined abnormal load conditions as before, but in this case the load circuit constitutes one element in a bridge circuit in which a predetermined unbalance maintains the grid potentials of the main valves in phase opposition to the anode potentials of these valves and thus maintains the load circuit disconnected from the supply circuit.

For a better understanding of my invention, together with other and further objects thereof, reference is had to the following description taken in connection with the accompanying drawing and its scope will be pointed out in the appended claims. Fig. 1 of the accompanying drawing illustrates my invention as applied to an automatic reclosing circuit breaker system of the notching type, while Fig. 2 represents my invention as applied to such a system of the feeling out type.

Referring now to Fig. 1, I have illustrated an arrangement for controlling the connection and disconnection of a load circuit 10 and a source of alternating current 11. The load circuit 10 is illustrated as a direct current circuit energized from the circuit 11 through a full wave rectifier comprising a transformer 12 and electric valves 13 and 14, although it will be apparent that electric valves 13 and 14 may be reversely connected in parallel in case it is desired to energize the load circuit 10 with alternating current, or that the supply and load circuits may be interconnected by means of any suitable circuit interrupting means, in which case the operation of such means will be controlled by the electric valves 13 and 14. Electric valves 13 and 14 are each provided with an anode, a cathode and a control grid and may be of any of the several types well known in the art, although I prefer to use valves of the vapor electric discharge type, the conductivity of which may be easily controlled by impressing alternating potentials upon the grids of the valves and varying the phase of the grid potentials with respect to the anode potentials of the valves. The grids of electric valves 13 and 14 are connected to the common cathode circuit through opposite halves of the secondary winding of a grid transformer 15 and a negative bias battery 16. The primary winding of grid transformer 15 is energized from an impedance phase shifting circuit comprising an inductive winding 17 energized from the alternating current circuit 11 and a reactor 18 and a saturable reactor 19 serially connected across the inductive winding 17, the primary winding of the grid transformer preferably being connected between the electrical midpoint of the winding 17 and the junction of reactors 18 and 19. The reactor 19 is provided with a saturating winding 20 which may be energized from the alternating current circuit 11 through a transformer 21 and an electric valve 22, which is also preferably a three-electrode vapor electric discharge valve. The grid circuit of the valve 22 includes a negative bias battery 22a and a capacitor 23. The capacitor 23 is adapted to be charged through a rectifier arrangement comprising a transformer 24, the primary winding of which is connected to the alternating current circuit 11, and electric valves 25 and 26 connected in a well-known manner to provide full wave rectification. Capacitor 23 is preferably provided with a discharge resistor 27. In order to control the conductivity of electric valves 13 and 14 through the above described apparatus in response to predetermined abnormal load conditions, I have provided a current transformer 28 having a primary winding connected in series with the alternating current line 11 and a secondary winding connected to a potentiometer 29. The grids of electric valves 25 and 26 are connected to their common cathode connection through opposite halves of the secondary winding of a grid transformer 30 and negative bias batteries 31 and 32 respectively. The primary winding of the grid transformer 30 is energized from the potentiometer 29. The above described apparatus serves to disconnect the load circuit 10 from the supply circuit 11 upon the occurrence of abnormal load conditions and to reconnect the load circuit to the supply circuit after an interval determined by the time required to discharge the capacitor 23 through resistor 27. In order to limit the number of reclosing operations there is provided an integrating apparatus comprising a capacitor 33 adapted to receive an increment of charge from the alternating current circuit 11 through a transformer 34, electric valve 35 and a variable resistor 36 each time that the load circuit 10 is disconnected from the supply circuit 11. This is accomplished by connecting the grid of electric valve 35, which is preferably of the vapor electric discharge type, to its cathode through a negative bias battery 37 and a potentiometer 38 which is included in the charging circuit of capacitor 23. The capacitor 33 is also connected in an auxiliary circuit including an electric valve 39 and a resistor 40. Electric valve 39 is preferably a three-electrode vapor electric discharge valve provided with a grid circuit including a negative bias battery 41, capacitor 33 and a resistor 40. The resistor 40 is also included in the grid circuit of an electric valve 42 which is connected in a lockout circuit comprising the valve 42, a battery 43, a switch 44 and resistor 27. A negative bias battery 45 may be included in the grid circuit of electric valve 42 which is preferably a vapor electric discharge valve.

In explaining the operation of the above described apparatus, it will be assumed that it has been operating under normal conditions and that the load circuit 10 suddenly draws an abnormal load from supply circuit 11 due to a fault on the load circuit 10 or any other cause. The potential derived from the current transformer 28 and impressed upon the grids of electric valves 25 and 26 by means of the potentiometer 29 and grid transformer 30, will now rise to a value sufficient to overcome the negative bias of the batteries 31 and 32 with the result that the valves 25 and 26 are rendered conducting. Capacitor 23 is now charged from the alternating current circuit 11 through the rectifier arrangement comprising transformer 24 and valves 25 and 26. As the potential of the capacitor 23 rises to a predetermined value, electric valve 22 is rendered conducting and the saturating winding 20 of reactor 19 is energized from the alternating current circuit through the transformer 21 and electric valve 22. It will be noted that both branches of the parallel circuit including inductive winding 17, the reactors 18 and 19 are inductive and it will be assumed that the reactance of reactor 18 and that of reactor 19 when in an unsaturated condition are such that the potential impressed upon the grids of the valves 13 and 14 through the grid transformer 15 are in phase with the anode potentials of these valves. Under the abnormal conditions just described, however, the winding 20 becomes saturated, reducing the reactance of 19 to such a value that the potential applied through the grid transformer 15 to the grids of the valves 13 and 14 reverses polarity and becomes in phase opposition to the anode potentials of these valves. The valves 13 and 14 are now completely non-conducting and the load circuit 10 is disconnected from the supply circuit 11. The potential derived from the current transformer 28 is now reduced to zero with the result that the charging of capacitor 23 is interrupted and it slowly discharges through resistor 27. When capacitor 23 becomes substantially completely discharged the grid potential of electric valve 22 will drop below its critical value and the saturating current to reactor 20 will be interrupted with the result that the grid potential of electric valves 13 and 14 is again reversed in polarity to render these valves conducting. If abnormal conditions still obtain on the direct current load circuit 10, the above described cycle will be repeated.

In order to avoid an indefinite number of reclosures under abnormal load conditions which may cause not only surges and disturbances upon the alternating current circuit 11 but also actual damage to the various circuits and apparatus associated with the load circuit 10, there is provided an arrangement for integrating the number of times the load circuit 10 is disconnected from supply circuit 11. It will be noted that a resistor 38 is included in the charging circuit of capacitor 23 and that a variable portion of this resistor is also included in the grid circuit of electric valve 35 with such a polarity as to oppose the negative bias of the battery 37. During the short interval while the capacitor 23 is being charged the potential drop across the resistor 38 overcomes the negative bias of the battery 37 to render valve 35 conducting so that a capacitor 33 is charged during the same interval of time from the alternating current supply circuit 11 through transformer 34, the valve 35 and variable resistor 36. The amount of energy stored in the capacitor 33 during this interval is, of course, dependent upon the setting of variable resistor 36. The circuit constants may be so selected that the capacitor 33 will become substantially completely charged after any predetermined number of operations of the disconnecting apparatus. For example, three such operations are often found the most satisfactory. Capacitor 33 is included in the grid circuit of electric valve 39 which also includes a negative bias battery 41 of such a magnitude as to hold the valve 39 non-conducting until capacitor 33 becomes substantially completely charged. At the time corresponding to the predetermined number of operations of the disconnecting apparatus, valve 39 becomes conducting and the capacitor 33 discharges through a circuit comprising valve 39 and resistor 40. Resistor 40 is included in the grid circuit of electric valve 42 which also includes a negative bias battery 45. When the capacitor 33 is discharging through resistor 40 the potential drop across this resistor is sufficient to overcome the negative bias of the battery 45 to render valve 42 conducting. With switch 44 in its closed position, the battery 43 sends a current through valve 42 and resistor 27 at the same time of course, fully charging capacitor 23. Since the battery 43 supplies a unidirectional potential, the current in the valve 42 is not interrupted when its grid is again made negative in response to the interruption of the abnormal load current. The valve 22 is now permanently conducting so that the reactor 20 is maintained in a saturated condition to render the valves 13 and 14 permanently non-conducting. Load circuit 10 is now completely disconnected from the alternating current supply circuit 11 and can be reconnected only by manually opening the switch 44.

In Fig. 2 there is illustrated an application of my invention to an automatic reclosing circuit breaker system of the feeling out type. In this figure the arrangement for disconnecting the load circuit 10 from the alternating current supply circuit 11 in response to predetermined abnormal load conditions is the same as that illustrated in Fig. 1, but the arrangement for controlling the reclosing operation is substantially different. In this arrangement the load circuit comprises one arm of a Wheatstone bridge 50, the other arms of which comprise resistors 51, 52 and 53, respectively. One diagonal of this bridge is energized from the alternating current circuit 11 through a rectifying arrangement comprising a transformer 54 and a pair of electric valves 55 connected in the usual manner for obtaining full wave rectification. A resistor 56 is also included in this energizing circuit in order to limit the current through this bridge to a small percentage of normal load current. The unbalance voltage of the Wheatstone bridge 50 is applied to the saturating winding 57 of a reactor 58 through a rectifying device shown as a contact rectifier 59. In some cases it may be desirable to connect a hot-cathode rectifier 60 in parallel to the contact rectifier 59 and with a reverse polarity in order to protect the rectifier 59 from the high inverse potentials occurring during normal operation when the bridge circuit 50 is subjected to full line voltage. The saturating reactor 58 makes up one arm of an alternating current impedance bridge comprising reactor 58, reactor 68, and resistors 61 and 62. The unbalance voltage of the impedance bridge is applied to a potentiometer 63, the variable portion of which is included in series with a negative bias battery 64 in the grid circuit of an electric valve 65. Electric valve 65 is preferably a three-electrode vapor electric discharge device and is connected in a lockout circuit comprising this valve, a resistor 66 and the resistor 27. This circuit is adapted to be energized from the alternating current circuit 11 through a transformer 67. The function of the alternating current impedance bridge is to increase the sensitivity of the apparatus, but in certain cases it may be omitted without affecting the operation of the apparatus as a whole, in which case the potentiometer 63 is energized directly from the Wheatstone bridge 50.

The operation of the above described apparatus to disconnect the load circuit 10 from the alternating current supply circuit 11 upon the occurrence of predetermined abnormal load conditions is similar to that described in connection with the apparatus illustrated in Fig. 1. Under normal load conditions, Wheatstone bridge 50 is unbalanced in such a direction as to tend to send current through the saturating winding 57 in a direction opposite to the conductivity of the rectifier device 59 with the result that the reactor 58 is unsaturated. Under this condition the impedance bridge is balanced, no potential is applied to the grid of the valve 65 from the potentiometer 63 and the negative bias battery 64 maintains this valve non-conducting. When the load circuit becomes deenergized, however, due to the disconnecting operation of the apparatus resulting from abnormal load conditions, as described above, the resistance of the load circuit is sufficiently low to unbalance the Wheatstone bridge 50 in an opposite direction so that the unbalance voltage of this bridge energizes the saturating winding 57 of reactor 58. The alternating current impedance bridge now becomes unbalanced in such a direction as to impose a positive potential upon the grid of the valve 65 through the potentiometer 63. The valve 65 becomes conducting and passes a current from the transformer 67 through resistor 27 in the same direction as that derived from the rectifying apparatus comprising the transformer 24 and electric valves 25 and 26. The result is that the negative bias of the battery 22a is overcome by the potential across the resistor 27 and electric valve 22 is maintained conducting to energize the saturating winding 20 of the reactor 19. When the fault on the direct current load circuit 10 has been removed so that its load resistance rises to normal value, the Wheatstone bridge 50 becomes balanced and the reactor 58 becomes unsaturated to balance the impedance bridge. Under this condition the potential applied to the grid of the valve 65 from the potentiometer 63 is reduced to zero and the negative bias battery 64 renders this valve non-conducting. The charge on capacitor 23 slowly leaks off through resistor 27 and, when it becomes substantially completely discharged, negative bias battery 22a renders the grid of the valve 22 negative to interrupt the saturating current to the winding 20 of reactor 19. The grid potential of the valves 13 and 14 is now advanced in phase through substantially 180 degrees to render these valves conducting and again energize the direct current load circuit 10.

While I have described what I at present consider the preferred embodiments of my invention it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States is:

1. In a system of distribution, an alternating current supply circuit, a load circuit, means including an electric valve for transmitting energy therebetween, means responsive to abnormal circuit conditions for rendering said valve non-conductive, and other means responsive to sustained abnormal circuit conditions for modifying the control of said valve.

2. In a system of distribution, an alternating current supply circuit, a load circuit, means including an electric valve for transmitting energy therebetween, means responsive to abnormal circuit conditions for rendering said valve non-conductive, and other means responsive to sustained abnormal circuit conditions for maintaining said valve non-conductive.

3. In a system of distribution, an alternating current supply circuit, a load circuit, means including an electric valve for transmitting energy therebetween, means including an energy storage device for controlling the conductivity of said valve, means responsive to abnormal circuit conditions for storing energy in said device to render said valve non-conductive, and other means responsive to sustained abnormal circuit conditions for modifying the control of said valve.

4. In a system of distribution, an alternating current supply circuit, a load circuit, means including an electric valve for transmitting energy therebetween, means including an energy storage device for controlling the conductivity of said valve, means responsive to abnormal circuit conditions for storing energy in said device to render said valve non-conductive, and other means responsive to sustained abnormal circuit conditions for independently supplying energy to said device.

5. In a system of distribution, an alternating current supply circuit, a load circuit, means including an electric valve for transmitting energy therebetween, means including a capacitor for controlling the conductivity of said valve, means including a second electric valve for charging said capacitor from said supply circuit, means for rendering said second valve conductive only upon the occurrence of predetermined abnormal circuit conditions, and means responsive to sustained abnormal circuit conditions for modifying the control of said first valve.

6. In a system of distribution, an alternating current supply circuit, a load circuit, means including an electric valve for transmitting energy therebetween, means including a capacitor for controlling the conductivity of said valve, a circuit for charging said capacitor from said supply circuit including a second electric valve provided with a control grid, means for normally biasing said control grid to maintain said second valve non-conductive, means responsive to a predetermined flow of current to said load circuit for overcoming said biasing means to render said first valve non-conductive, and means responsive to sustained abnormal circuit conditions for modifying the control of said first valve.

7. In a system of distribution, a supply circuit, a load circuit, circuit interrupting means interconnecting said circuits, means including an electric valve for controlling the operation of said circuit interrupting means, means responsive to abnormal circuit conditions for controlling the conductivity of said valve to effect the opening of said circuit interrupting means for only a predetermined interval whereby said load circuit is disconnected from said supply circuit and reconnected thereto after said interval, and means responsive to a predetermined number of said disconnecting operations for controlling the conductivity of said valve to maintain said circuit interrupting means in an open condition.

8. In a system of distribution, an alternating current supply circuit, a load circuit, circuit interrupting means interconnecting said circuits, means including an electric valve for controlling the operation of said circuit interrupting means, means operable upon the occurrence of abnormal load conditions for controlling the conductivity of said valve to effect the periodic operation of said circuit interrupting means, and means responsive to a predetermined number of said interupting operations for rendering said valve inoperative to close said interrupting means.

9. In a system of distribution, an alternating current supply circuit, a load circuit, means including an electric valve for transmitting energy therebetween, means responsive to abnormal circuit conditions for rendering said valve non-conductive for only a predetermined interval whereby said load circuit is disconnected from said supply circuit and reconnected thereto after said interval, and means responsive to a predetermined number of said disconnecting operations for maintaining said valve non-conductive.

10. In a system of distribution, an alternating current supply circuit, a load circuit, means including an electric valve for transmitting energy therebetween, means responsive to abnormal circuit conditions for rendering said valve non-conductive for only a predetermined interval whereby said load circuit is disconnected from said supply circuit and reconnected thereto after said interval, means for integrating the number of successive disconnecting operations, and means controlled by said last mentioned means for maintaining said valve non-conductive indefinitely.

11. In a system of distribution, an alternating current supply circuit, a load circuit, means including an electric valve for transmitting energy therebetween, means responsive to abnormal circuit conditions for rendering said valve non-conductive for only a predetermined interval whereby said load circuit is disconnected from said supply circuit and reconnected thereto after said interval, a capacitor, means for applying an increment of charge to said capacitor at each disconnecting operation, means for discharging said capacitor when it becomes charged to a predetermined potential, and means controlled by the discharge of said capacitor for maintaining said valve non-conductive indefinitely.

12. In a system of distribution, an alternating current supply circuit, a load circuit, means including an electric valve for transmitting energy therebetween, a capacitor and associated discharge resistor for controlling the conductivity of said valve, means for charging said capacitor upon the occurrence of predetermined abnormal circuit conditions, a second capacitor, a charging circuit therefor including a second electric valve, means for controlling said second valve in response to the charging current of said first capacitor, means for discharging said second capacitor when it becomes charged to a predetermined potential, a second charging circuit for said first capacitor including a third electric valve, and means for controlling the conductivity of said third valve in response to the discharge of said second capacitor.

13. In a system of distribution, an alternating current supply circuit, a load circuit, means including an electric valve for transmitting energy therebetween, means responsive to abnormal circuit conditions for rendering said valve non-conductive for a predetermined interval, other means responsive to sustained abnormal circuit conditions for maintaining said valve non-conductive, and manually operable means for interrupting the operation of said other means.

14. In a system of distribution, an alternating current supply circuit, a load circuit, means including an electric valve for transmitting energy therebetween, means responsive to abnormal circuit conditions for rendering said valve non-conductive, and other means responsive to abnormal circuit conditions for maintaining said valve non-conductive while said abnormal conditions obtain.

15. In a system of distribution, an alternating current supply circuit, a load circuit, means including an electric valve for transmitting energy therebetween, means responsive to abnormal circuit conditions for rendering said valve non-conductive, a bridge circuit one element of which comprises the load circuit, and means responsive to an unbalance of said bridge for maintaining said valve non-conducting while said abnormal conditions obtain.

16. In a system of distribution, an alternating current supply circuit, a load circuit, means including an electric valve for transmitting energy therebetween, means responsive to abnormal circuit conditions for rendering said valve non-conductive, a bridge circuit one element of which comprises the load circuit, a second bridge circuit the impedance of one element of which is controlled by the unbalance voltage of said first bridge, and means responsive to the unbalance of said second bridge for maintaining said valve non-conducting while said abnormal conditions obtain.

17. In a system of distribution, an alternating current supply circuit, a load circuit, means including an electric valve for transmitting energy therebetween, a capacitor for controlling the conductivity of said valve, means responsive to abnormal circuit conditions for charging said capacitor, and means for independently charging said capacitor so long as said abnormal conditions obtain.

18. In a system of distribution, an alternating current supply circuit, a load circuit, means including an electric valve for transmitting energy therebetween, a capacitor for controlling the conductivity of said valve, means responsive to abnormal circuit conditions for charging said capacitor, a bridge circuit the balance of which is determined by said circuit conditions, a second circuit for charging said capacitor including an electric valve, and means for controlling said valve in response to the unbalance voltage of said bridge.

19. In a system of distribution, an alternating current supply circuit, a load circuit, means including an electric valve for transmitting energy therebetween, a capacitor for controlling the conductivity of said valve, means responsive to abnormal circuit conditions for charging said capacitor, a resistance bridge, one element of which comprises said load circuit, an impedance bridge including a saturable reactor, means for saturating said reactor in accordance with the unbalance of said resistance bridge in only a given direction, a circuit for independently charging said capacitor including a second electric valve, and means for controlling the conductivity of said second electric valve in accordance with the unbalance of said impedance bridge.

20. In an electric translating system, the combination of a controlled circuit, a source of unidirectional control potential variable in magnitude and polarity, means including a saturable reactor for controlling an electrical condition of said controlled circuit, a saturating winding for said reactor energized from said source, and a unilaterally conductive device in circuit with said saturating winding for limiting the controlling effect of said source to a predetermined polarity.

ALAN S. FITZ GERALD.